US008553972B2

(12) United States Patent
Kim et al.

(10) Patent No.: US 8,553,972 B2
(45) Date of Patent: Oct. 8, 2013

(54) APPARATUS, METHOD AND COMPUTER-READABLE MEDIUM GENERATING DEPTH MAP

(75) Inventors: Ji Won Kim, Seoul (KR); Gangyu Ma, Beijing (CN); Haitao Wang, Beijing (CN); Xiying Wang, Beijing (CN); Ji Yeun Kim, Seoul (KR); Yong Ju Jung, Daejeon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 465 days.

(21) Appl. No.: 12/830,822

(22) Filed: Jul. 6, 2010

(65) Prior Publication Data

US 2011/0026808 A1 Feb. 3, 2011

(30) Foreign Application Priority Data

Jul. 6, 2009 (CN) .......................... 2009 1 0151710
May 25, 2010 (KR) ........................ 10-2010-0048625

(51) Int. Cl.
*G06K 9/00* (2006.01)
*G06K 9/32* (2006.01)
*H04N 13/00* (2006.01)

(52) U.S. Cl.
USPC ....... 382/154; 382/294; 348/43; 348/E13.002

(58) Field of Classification Search
USPC ......... 382/154, 168–172, 240–243, 260, 264, 382/298–300, 294; 345/419, 426–427, 420; 348/362, 371, 364, 207.99, 366, 365, 348/348, 43, E13.002
See application file for complete search history.

(56) References Cited

U.S. PATENT DOCUMENTS

| 6,654,020 | B2 * | 11/2003 | Mori .............................. 345/475 |
| 6,956,569 | B1 * | 10/2005 | Roy et al. ...................... 345/426 |
| 7,643,685 | B2 * | 1/2010 | Miller ........................... 382/209 |
| 7,853,085 | B2 * | 12/2010 | Miller ........................... 382/215 |
| 2004/0190775 | A1 * | 9/2004 | Miller ........................... 382/190 |
| 2005/0232507 | A1 * | 10/2005 | Zimmer ......................... 382/264 |
| 2007/0019883 | A1 * | 1/2007 | Wong et al. ................... 382/276 |
| 2007/0024614 | A1 * | 2/2007 | Tam et al. ..................... 345/419 |

(Continued)

OTHER PUBLICATIONS

Lutz Falkenhagen, 3D object-based depth estimation from stereoscopic image sequences, Proc. Internat. Workshop on Stereoscopic and 3D Imaging, 1995, Universitt Hannover.*

*Primary Examiner* — Andrae S Allison
(74) *Attorney, Agent, or Firm* — Staas & Halsey LLP

(57) ABSTRACT

Disclosed are an apparatus, a method and a computer-readable medium automatically generating a depth map corresponding to each two-dimensional (2D) image in a video. The apparatus includes an image acquiring unit to acquire a plurality of 2D images that are temporally consecutive in an input video, a saliency map generator to generate at least one saliency map corresponding to a current 2D image among the plurality of 2D images based on a Human Visual Perception (HVP) model, a saliency-based depth map generator, a three-dimensional (3D) structure matching unit to calculate matching scores between the current 2D image and a plurality of 3D typical structures that are stored in advance, and to determine a 3D typical structure having a highest matching score among the plurality of 3D typical structures to be a 3D structure of the current 2D image, a matching-based depth map generator; a combined depth map generator to combine the saliency-based depth map and the matching-based depth map and to generate a combined depth map, and a spatial and temporal smoothing unit to spatially and temporally smooth the combined depth map.

15 Claims, 16 Drawing Sheets

(56) References Cited

U.S. PATENT DOCUMENTS

| | | | |
|---|---|---|---|
| 2008/0310757 A1* | 12/2008 | Wolberg et al. | 382/285 |
| 2011/0032341 A1* | 2/2011 | Ignatov et al. | 348/51 |
| 2011/0249099 A1* | 10/2011 | Vandewalle et al. | 348/47 |
| 2012/0056887 A1* | 3/2012 | Kim et al. | 345/426 |
| 2012/0056984 A1* | 3/2012 | Zhang et al. | 348/43 |
| 2012/0194642 A1* | 8/2012 | Lie et al. | 348/43 |
| 2012/0219236 A1* | 8/2012 | Ali et al. | 382/276 |

\* cited by examiner

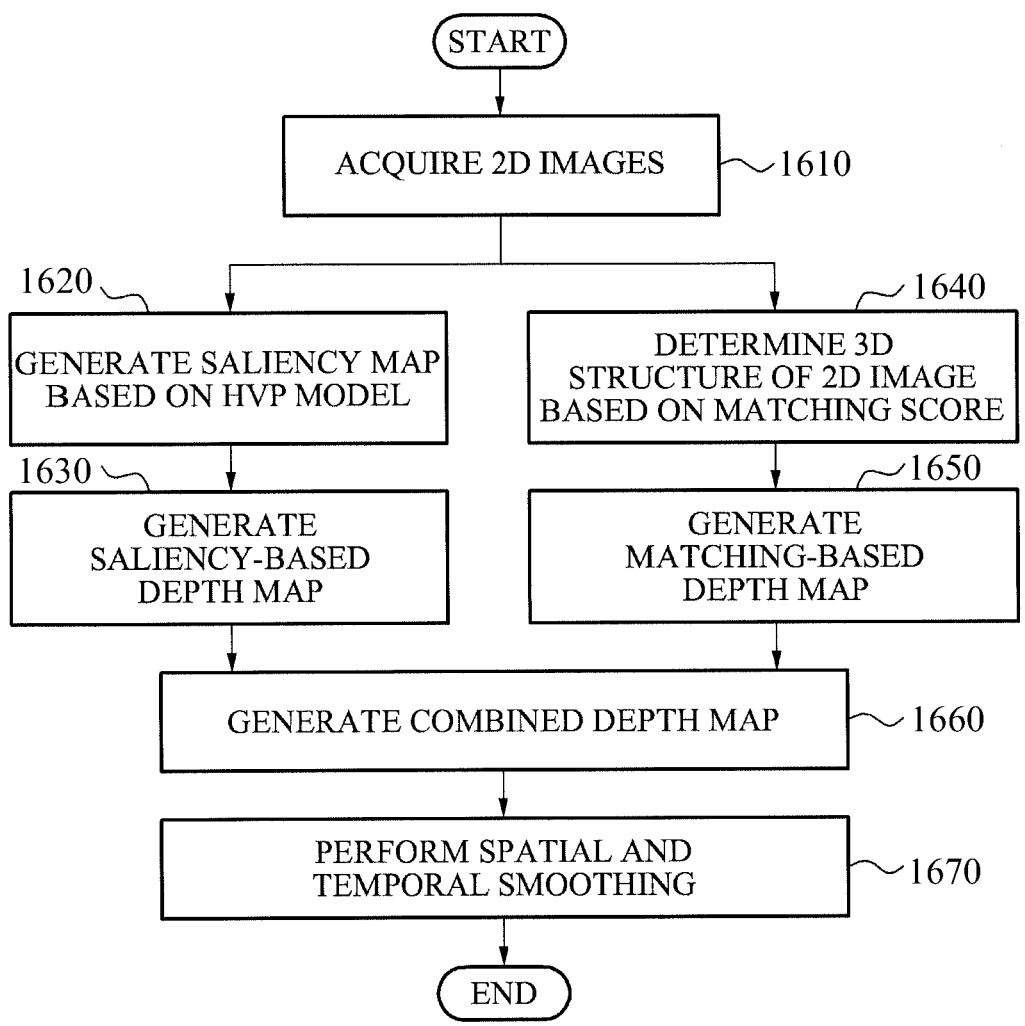

APPARATUS, METHOD AND COMPUTER-READABLE MEDIUM GENERATING DEPTH MAP

CROSS-REFERENCE TO RELATED APPLICATIONS

This application claims the benefit of Chinese Patent Application No. 200910151710.3, filed on Jul. 6, 2009, and Korean Patent Application No. 10-2010-0048625, filed on May 25, 2010, in the Korean Intellectual Property Office, the disclosures of which are incorporated herein by reference.

BACKGROUND

1. Field

One or more embodiments of the following description relate to an apparatus, a method and a computer-readable medium generating a depth map, and more particularly, to an apparatus a method and a computer-readable medium automatically generating a depth map corresponding to a two-dimensional (2D) image in each frame of a video among general videos.

2. Description of the Related Art

Recently, three-dimensional (3D) TV is emerging as a popular issue in both research fields and business markets. A 3D TV is different from a conventional two-dimensional (2D) TV in that it can display stereo video. Viewers may feel a depth effect as if they are watching a real 3D scene. The depth effect is based on a human's binocular vision model. People see the real world using both eyes, which may receive different images when viewing a 3D scene. By independently projecting two different images to each eye, people can reconstruct a 3D scene in their mind.

However, currently most media, such as films or video, and image capturing devices, such as digital cameras or film cameras, are still based on a mono system using a single camera. When the media are directly displayed on a 3D TV, 3D effects may not be shown. To convert the media to 3D video, one solution is to hire many workers to manually label a depth map of each region in video. The conversion result is quite satisfying, however, not easily achievable because too much manpower is required.

Even though solutions have been already provided, the solutions are limited for use in general video sequences. For example, one solution is to provide a depth display system requiring a computer interaction. However, in this example, it is difficult to completely realize unmanned monitoring of a 3D TV, and to operate the 3D TV in real time since a user's inputs is required. Alternatively, assuming that only an object in an image is horizontally moved and a background of the image stops, a stereo video difference may be simulated based on a motion visual difference. However, it is difficult to process a general video in real-time, and as a result there are limits in processing of video.

SUMMARY

According to example embodiments, there may be provided an apparatus, method and computer-readable medium completely automatically processing various types of video including a still image sequence without a user's input.

The foregoing and/or other aspects are achieved by providing an apparatus generating a depth map, the apparatus including: an image acquiring unit to acquire a plurality of two-dimensional (2D) images, the plurality of 2D images temporally consecutive in an input video; a three-dimensional (3D) structure matching unit to calculate matching scores between a current 2D image among the plurality of 2D images and a plurality of 3D typical structures, and to determine a 3D typical structure having a highest matching score among the plurality of 3D typical structures to be a 3D structure of the current 2D image, the plurality of 3D typical structures stored in advance; and a matching-based depth map generator to store, in advance, depth maps of the 3D typical structures, and to set a depth map of the determined 3D typical structure to be a matching-based depth map corresponding to the current 2D image, each pixel in the matching-based depth map displaying a matching-based depth value of a corresponding pixel in the current 2D image.

The matching-based depth value may be in a range of [0, 1] where a value of "0" indicates that a corresponding pixel has a maximum depth value and a value of "1" indicates that a corresponding pixel has a minimum depth value.

The 3D structure matching unit may include a plane division module to divide the current 2D image into at least one region corresponding to a plane of the 3D typical structure matched with the current 2D image; a matching score calculation module to calculate a density of the at least one region based on a feature distribution of the at least one region, to calculate an average value of features of the at least one region, to calculate a similarity between two regions based on a norm of a difference between the average values, and to calculate a matching score based on a sum of the density and the similarity; and a 3D structure determination module to determine, based on the calculated matching score, the 3D typical structure having the highest matching score to be the 3D structure of the current 2D image.

The matching score calculation module may calculate a density of a region r based on $$\frac{1}{1+std(r)} \text{ where } std(r) = \sqrt{\frac{\sum_{p \in r}(I(p)-\bar{I})^2}{area(r)}},$$

p denotes a pixel of the region r, I(p) denotes a feature value of the pixel p, $\bar{I}$ denotes an average value of feature values of pixels in the region r, and area(r) denotes a number of the pixels in the region r.

The matching score calculation module may calculate a similarity between a region ri and a region rj based on $|\bar{I}_{ri}-\bar{I}_{rj}|$ where $\bar{I}$ denotes an average value of the features of the region, and |.| denotes a norm.

The features may include at least one of colors, gradients, and edges.

The norm may include at least one of a 1-norm, a 2-norm and a ∞-norm.

The foregoing and/or other aspects are achieved by providing an apparatus generating a depth map, the apparatus including: an image acquiring unit to acquire a plurality of 2D images, the plurality of 2D images temporally consecutive in an input video; a saliency map generator to generate at least one saliency map corresponding to a current 2D image among the plurality of 2D images based on a Human Visual Perception (HVP) model, each pixel in the saliency map showing a saliency of a corresponding pixel in the current 2D image; a saliency-based depth map generator to generate a saliency-based depth map corresponding to the current 2D image, using the at least one saliency map, each pixel in the saliency-based depth map displaying a saliency-based depth value of the corresponding pixel in the current 2D image; a 3D structure matching unit to calculate matching scores between the current 2D image and a plurality of 3D typical structures, and to determine a 3D typical structure having a highest matching score among the plurality of 3D typical structures to be a 3D structure of the current 2D image, the plurality of 3D typical structures stored in advance; a matching-based depth map generator to store, in advance, depth maps of the 3D typical structures, and to set a depth map of the determined 3D typical structure to be a matching-based depth map corresponding to the current 2D image, each pixel in the matching-based depth map displaying a matching-based depth value of a corresponding pixel in the current 2D image; and a combined depth map generator to combine the saliency-based depth map and the matching-based depth map and to generate a combined depth map, each pixel in the combined depth map displaying a combined depth value of the corresponding pixel in the current 2D image.

The saliency map generator may include a feature saliency map generation module to identify features of the current 2D image and to generate a feature saliency map; a motion saliency map generation module to identify a motion between the current 2D image and a 2D image and to generate a motion saliency map, the 2D image temporally neighboring the current 2D image; an object saliency map generation module to identify an object of the current 2D image and to generate an object saliency map; and a saliency map control module to generate arbitrary one or two or all saliency maps using at least one of the feature saliency map generation module, the motion saliency map generation module, and the object saliency map generation module.

The saliency-based depth map generator may generate a saliency-based depth map through the following processes including: when the saliency map generator generates only an object saliency map, assigning a constant value in a range of (0, 1) to a pixel corresponding to a pixel identified as an object of a 2D image in the saliency-based depth map, and assigning a value of "0" to other pixels in the saliency-based depth map; when the saliency map generator generates either a feature saliency map or a motion saliency map, assigning a value in a range of [0, 1] to each pixel in the saliency-based depth map based on a saliency of each pixel in the feature saliency map or the motion saliency map, a value of "0" indicating that a corresponding pixel has a minimum saliency and a value of "1" indicating that a corresponding pixel has a maximum saliency; when the saliency map generator generates two saliency maps other than an object saliency map, assigning a standardized value or a relatively large value to a corresponding pixel in the saliency-based depth map, the standardized value obtained by adding corresponding pixels in the two saliency maps, and the relatively large value selected from among the corresponding pixels; when the saliency map generator generates two saliency maps including an object saliency map, assigning a constant value in a range of (0, 1) to a pixel corresponding to each pixel identified as an object in the object saliency map in the saliency-based depth map, and assigning a corresponding pixel value of the other saliency map to other corresponding pixels in the saliency-based depth map; and when the saliency map generator generates all saliency maps, assigning a constant value in a range of (0, 1) to a pixel corresponding to each pixel identified as an object in the object saliency map in the saliency-based depth map, and assigning a standardized value or a relatively large value to a corresponding pixel in the saliency-based depth map, the standardized value obtained by adding corresponding pixels in two saliency maps other than the object saliency map, and the relatively large value selected from among the corresponding pixels.

Pixel values of the saliency-based depth map and the matching-based depth map may be in a range of [0, 1] where a value of "0" indicates that a corresponding pixel has a maximum depth value, and a value of "1" indicates that a corresponding pixel has a minimum depth value.

The combined depth map generator may select either a standardized value obtained by adding corresponding pixels in the saliency-based depth map and the matching-based depth map, or a relatively large value among the corresponding pixels, and may generate a combined depth map.

The object of the current 2D image may include at least one of a human, a face and a text.

The foregoing and/or other aspects are also achieved by providing an apparatus smoothing a depth map, the apparatus including: an image acquiring unit to acquire a plurality of 2D images, the plurality of 2D images temporally consecutive in an input video; an initial depth map acquiring unit to acquire an initial depth map corresponding to each of the plurality of 2D images, each pixel value of the initial depth map a depth value of a corresponding pixel in a corresponding 2D image; and a spatial and temporal smoothing unit to spatially and temporally smooth the initial depth map.

The spatial and temporal smoothing unit may include a smoothness calculation module to calculate a smoothness S(P1,P2) based on a similarity, a distance, and a difference in depth value between a pixel P1(x, y, t) at a time t and a pixel P2 (x+Δx, y+Δy, t+Δt) at a time t+Δt in accordance with an HVP model, and to determine values of Δx, Δy and Δt based on an expected smoothing effect, the pixels P1 and P2 in the current 2D image; and a smoothing module to calculate a depth value D'(P1)=D(P1)−S(P1) of the pixel P1, the pixel P1 smoothed based on the smoothness S(P1,P2), the smoothness S(P1,P2) used to allow an absolute value of a difference between the depth value D'(P1)=D(P1)−S(P1) of the smoothed pixel P1 and a depth value D'(P2)=D(P2)+S(P1,P2) of the smoothed pixel P2 to be less than an absolute value of a difference between the depth value D(P1) of the pixel P1 and a depth value D(P2) of the pixel P2.

The smoothness calculation module may calculate the smoothness S(P1,P2) based on "(D(P1)−D(P2))*N(P1, P2)*C(P1, P2)" where D(.) denotes a depth value of a pixel, $$\text{wherein } N(P1, P2) = \begin{cases} 1, & |P1, P2| < 1 \\ 0, & |P1, P2| > 1, \end{cases}$$

$$\text{where } |P1, P2| = \sqrt{\Delta x^2 + \Delta y^2 + \Delta t^2}, \text{ and}$$

$$\text{wherein } C(P1, P2) = \begin{cases} 0.2, & |I(P1) - I(P2)| \le 32 \\ 0, & |I(P1) - I(P2)| \le 32, \end{cases}$$

where I(.) denotes a feature value of a pixel, and |.| denotes an absolute value of the feature value of the pixel. Here, the feature may include at least one of a color or a pattern.

The foregoing and/or other aspects are also achieved by providing an apparatus generating a depth map, the apparatus including: an image acquiring unit to acquire a plurality of 2D images, the plurality of 2D images temporally consecutive in an input video; a saliency map generator to generate at least one saliency map corresponding to a current 2D image among the plurality of 2D images based on a Human Visual Perception (HVP) model, each pixel in the saliency map showing a saliency of a corresponding pixel in the current 2D image; a saliency-based depth map generator to generate a saliency-based depth map corresponding to the current 2D image, using the at least one saliency map, each pixel in the saliency-based depth map displaying a saliency-based depth value of the corresponding pixel in the current 2D image; a 3D structure matching unit to calculate matching scores between the current 2D image and a plurality of 3D typical structures, and to determine a 3D typical structure having a highest matching score among the plurality of 3D typical structures to be a 3D structure of the current 2D image, the plurality of 3D typical structures stored in advance; a matching-based depth map generator to store, in advance, depth maps of the 3D typical structures, and to set a depth map of the determined 3D typical structure to be a matching-based depth map corresponding to the current 2D image, each pixel in the matching-based depth map displaying a matching-based depth value of the corresponding pixel in the current 2D image; a combined depth map generator to combine the saliency-based depth map and the matching-based depth map and to generate a combined depth map, each pixel in the combined depth map displaying a combined depth value of the corresponding pixel in the current 2D image; and a spatial and temporal smoothing unit to spatially and temporally smooth the combined depth map.

The foregoing and/or other aspects are also achieved by providing a method of generating a depth map, the method including: acquiring, by a processor, a plurality of 2D images, the plurality of 2D images temporally consecutive in an input video; calculating, by the processor, matching scores between a current 2D image among the plurality of 2D images and a plurality of 3D typical structures, and determining a 3D typical structure having a highest matching score among the plurality of 3D typical structures to be a 3D structure of the current 2D image, the plurality of 3D typical structures stored in advance; and storing, in advance, depth maps of the 3D typical structures, and setting, by the processor, a depth map of the determined 3D typical structure to be a matching-based depth map corresponding to the current 2D image, each pixel in the matching-based depth map displaying a matching-based depth value of a corresponding pixel in the current 2D image.

The calculating may include dividing the current 2D image into at least one region corresponding to a plane of the 3D typical structure matched with the current 2D image; calculating a density of the at least one region based on a feature distribution of the at least one region, calculating an average value of features of the at least one region, calculating a similarity between two regions based on a norm of a difference between the average values, and calculating a matching score based on a sum of the density and the similarity; and determining, based on the calculated matching score, the 3D typical structure having the highest matching score to be the 3D structure of the current 2D image.

A density of a region r may be calculated based on $$\frac{1}{1+std(r)} \text{ where } std(r) = \sqrt{\frac{\sum_{p \in r}(I(p)-\bar{I})^2}{area(r)}},$$

p denotes a pixel of the region r, l(p) denotes a feature value of the pixel p, $\bar{I}$ denotes an average value of feature values of pixels in the region r, and area(r) denotes a number of the pixels in the region r.

A similarity between a region ri and a region rj may be calculated based on $|\bar{I}_{ri}-\bar{I}_{rj}|$ where $\bar{I}$ denotes an average value of the features of the region, and |.| denotes a norm.

The foregoing and/or other aspects are also achieved by providing a method of generating a depth map, the method including: acquiring, by a processor, a plurality of 2D images, the plurality of 2D images temporally consecutive in an input video; generating, by the processor, at least one saliency map corresponding to a current 2D image among the plurality of 2D images based on a Human Visual Perception (HVP) model, each pixel in the saliency map showing a saliency of a corresponding pixel in the current 2D image; generating, by the processor, a saliency-based depth map corresponding to the current 2D image, using the at least one saliency map, each pixel in the saliency-based depth map displaying a saliency-based depth value of the corresponding pixel in the current 2D image; calculating, by the processor, matching scores between the current 2D image and a plurality of 3D typical structures, and determining a 3D typical structure having a highest matching score among the plurality of 3D typical structures to be a 3D structure of the current 2D image, the plurality of 3D typical structures stored in advance; storing, in advance, depth maps of the 3D typical structures, and setting, by the processor, a depth map of the determined 3D typical structure to be a matching-based depth map corresponding to the current 2D image, each pixel in the matching-based depth map displaying a matching-based depth value of a corresponding pixel in the current 2D image; and combining the saliency-based depth map and the matching-based depth map and generating, by the processor, a combined depth map, each pixel in the combined depth map displaying a combined depth value of the corresponding pixel in the current 2D image.

The generating of the at least one saliency map may include generating a feature saliency map based on features of the current 2D image; identifying a motion between the current 2D image and a 2D image and generating a motion saliency map, the 2D image temporally neighboring the current 2D image; identifying an object of the current 2D image and generating an object saliency map; and generating arbitrary one or two or all saliency maps using at least one of the feature saliency map generation module, the motion saliency map generation module, and the object saliency map generation module.

The generating of the saliency-based depth map may include when only an object saliency map is generated, assigning a constant value in a range of (0, 1) to a pixel corresponding to a pixel identified as an object of a 2D image in the saliency-based depth map, and assigning a value of "0" to other pixels in the saliency-based depth map; when either a feature saliency map or a motion saliency map is generated, assigning a value in a range of [0, 1] to each pixel in the saliency-based depth map based on a saliency of each pixel in the feature saliency map or the motion saliency map, a value of "0" indicating that a corresponding pixel has a minimum saliency and a value of "1" indicating that a corresponding pixel has a maximum saliency; when two saliency maps other than an object saliency map are generated, assigning a standardized value or a relatively large value to a corresponding pixel in the saliency-based depth map, the standardized value obtained by adding corresponding pixels in the two saliency maps, and the relatively large value selected from among the corresponding pixels; when two saliency maps including an object saliency map are generated, assigning a constant value in a range of (0, 1) to a pixel corresponding to each pixel identified as an object in the object saliency map in the saliency-based depth map, and assigning a corresponding pixel value of the other saliency map to other corresponding pixels in the saliency-based depth map; and when all saliency maps are generated, assigning a constant value in a range of (0, 1) to a pixel corresponding to each pixel identified as an object in the object saliency map in the saliency-based depth map, and assigning a standardized value or a relatively large value to a corresponding pixel in the saliency-based depth map, the standardized value obtained by adding corresponding pixels in two saliency maps other than the object saliency map, and the relatively large value selected from among the corresponding pixels.

The calculating may include dividing the current 2D image into at least one region corresponding to a plane of the 3D typical structure matched with the current 2D image; calculating a density of the at least one region based on a feature distribution of the at least one region, calculating an average value of features of the at least one region, calculating a similarity between two regions based on a norm of a difference between the average values, and calculating a matching score based on a sum of the density and the similarity; and determining, based on the calculated matching score, the 3D typical structure having the highest matching score to be the 3D structure of the current 2D image.

Either a standardized value obtained by adding corresponding pixels in the saliency-based depth map and the matching-based depth map, or a relatively large value among the corresponding pixels may be selected, and a combined depth map may be generated.

The foregoing and/or other aspects are also achieved by providing method of smoothing a depth map, the method including: acquiring, by a processor, a plurality of 2D images, the plurality of 2D images temporally consecutive in an input video; acquiring, by the processor, an initial depth map corresponding to each of the plurality of 2D images, each pixel value of the initial depth map a depth value of a corresponding pixel in a corresponding 2D image; and spatially and temporally smoothing, by the processor, the initial depth map.

The spatial and temporal smoothing may include calculating a smoothness S(P1, P2) based on a similarity, a distance and a difference in depth value between a pixel P1(x, y, t) at a time t and a pixel P2 (x+Δx, y+Δy, t+Δt) at a time t+Δt in accordance with an HVP model, and determining values of and Δx, Δy and Δt based on an expected smoothing effect, the pixels P1 and P2 in the current 2D image; and calculating a depth value D'(P1)=D(P1)−S(P1) of the pixel P1, the pixel P1 smoothed based on the smoothness S(P1, P2), the smoothness S(P1, P2) used to allow an absolute value of a difference between the depth value D'(P1)=D(P1)−S(P1) of the smoothed pixel P1 and a depth value D'(P2)=D(P2)+S(P1, P2) of the smoothed pixel P2 to be less than an absolute value of a difference between the depth value D(P1) of the pixel P1 and a depth value D(P2) of the pixel P2.

The smoothness S(P1, P2) may be calculated based on "(D(P1)−D(P2))*N(P1, P2)*C(P1, P2)" where D(.) denotes a depth value of a pixel, $$\text{wherein } N(P1, P2) = \begin{cases} 1, & |P1, P2| < 1 \\ 0, & |P1, P2| > 1, \end{cases}$$

$$\text{where } |P1, P2| = \sqrt{\Delta x^2 + \Delta y^2 + \Delta t^2}, \text{ and}$$

$$\text{wherein } C(P1, P2) = \begin{cases} 0.2, & |I(P1) - I(P2)| \leq 32 \\ 0, & |I(P1) - I(P2)| \leq 32, \end{cases}$$

where I(.) denotes a feature value of a pixel, and |.| denotes an absolute value of the feature value of the pixel. Here, the feature may include at least one of a color or a pattern.

The foregoing and/or other aspects are also achieved by providing a method of generating a depth map, the method including: acquiring, by the processor, a plurality of 2D images, the plurality of 2D images temporally consecutive in an input video; generating, by the processor, at least one saliency map corresponding to a current 2D image among the plurality of 2D images based on a Human Visual Perception (HVP) model, each pixel in the saliency map showing a saliency of a corresponding pixel in the current 2D image; generating, by the processor, a saliency-based depth map corresponding to the current 2D image, using the at least one saliency map, each pixel in the saliency-based depth map displaying a saliency-based depth value of the corresponding pixel in the current 2D image; calculating, by the processor, matching scores between the current 2D image and a plurality of 3D typical structures, and determining a 3D typical structure having a highest matching score among the plurality of 3D typical structures to be a 3D structure of the current 2D image, the plurality of 3D typical structures stored in advance; storing, in advance, depth maps of the 3D typical structures, and setting, by the processor, a depth map of the determined 3D typical structure to be a matching-based depth map corresponding to the current 2D image, each pixel in the matching-based depth map displaying a matching-based depth value of the corresponding pixel in the current 2D image; combining the saliency-based depth map and the matching-based depth map and generating, by the processor, a combined depth map, each pixel in the combined depth map displaying a combined depth value of the corresponding pixel in the current 2D image; and spatially and temporally smoothing the combined depth map.

According to another aspect of one or more embodiments, there is provided at least one computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which:

FIG. 16 illustrates a flowchart of a method for generating a depth map according to example embodiments.

DETAILED DESCRIPTION

Figure 1:
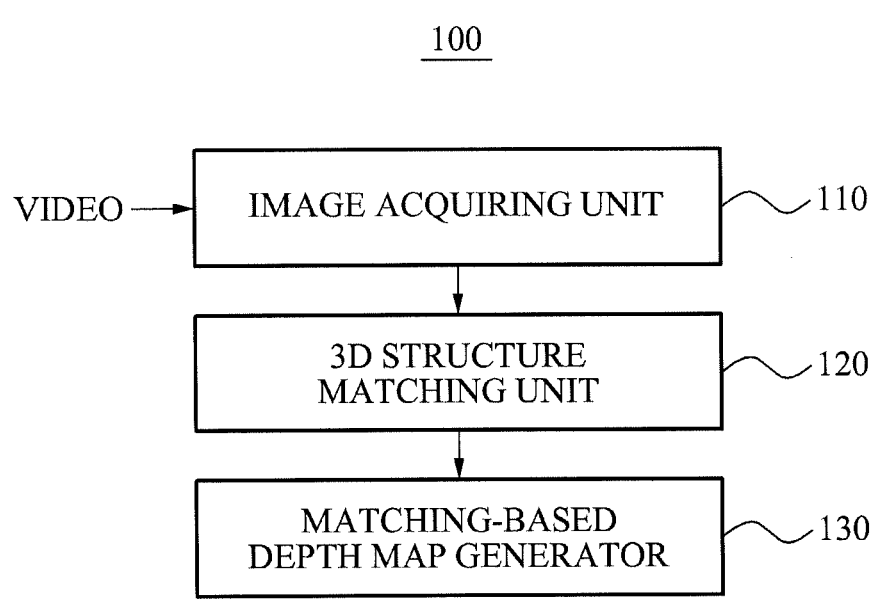
FIG. 1 illustrates a block diagram of an apparatus generating a depth map according to example embodiments.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates a block diagram of an apparatus 100 generating a depth map according to example embodiments.

Referring to FIG. 1, the apparatus 100 includes an image acquiring unit 110, a three-dimensional (3D) structure matching unit 120, and a matching-based depth map generator 130.

The apparatus 100 may receive an input video sequence including a plurality of images. The image acquiring unit 110 may acquire a plurality of two-dimensional (2D) images that are temporally consecutive in the input video sequence. The 3D structure matching unit 120 may obtain a 3D structure that is most closely matched with a current 2D image among the plurality of 2D images, from a plurality of 3D typical structures that are stored in advance.

Specifically, prior information about the 3D typical structures may be applied to obtain the 3D structure that is most closely matched with the current 2D image. Examples of 3D typical structures are illustrated in FIG. 2.

Figure 2:
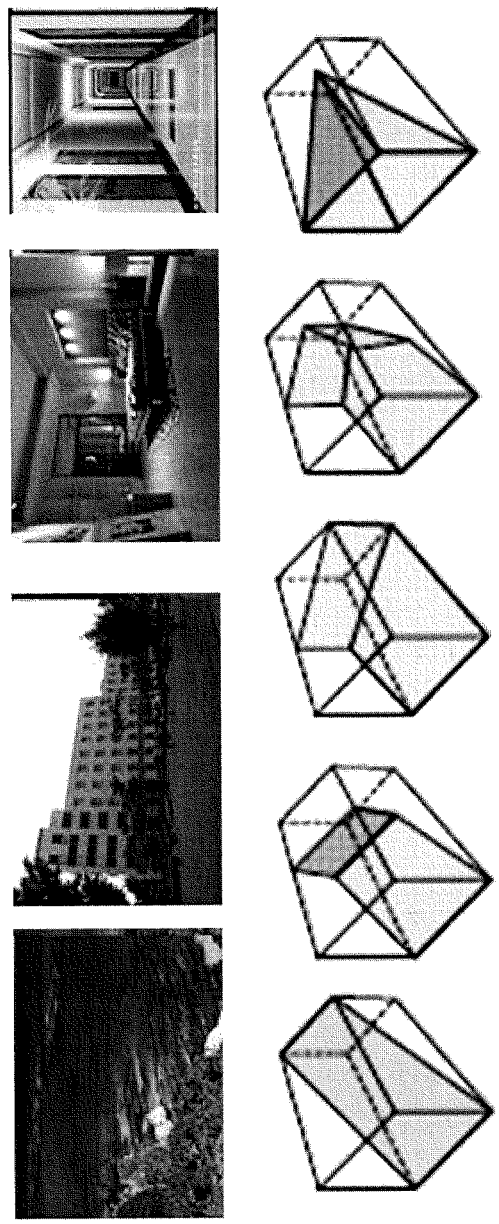
FIG. 2 illustrates a schematic diagram of examples of three-dimensional (3D) typical structures.

Referring to FIG. 2, a second row illustrates examples of 3D typical structures, and a first row illustrates examples of images of real scenes corresponding to the 3D typical structures. In reality, an actual structure of a scene is more complex than a 3D typical structure that is stored in advance. However, since the complex 3D structure may enable a viewer to feel various 3D effects when watching a 3D TV due to a limitation of a human visual system, a depth map of a 2D image may be generated using only a simple 3D structure, so that a better 3D experience may be provided as compared with a traditional 2D video.

To obtain the 3D structure that is most closely matched with the current 2D image, matching scores may be respectively calculated between the current 2D image and the plurality of 3D typical structures, and a 3D typical structure having a highest matching score may be determined to be the 3D structure of the current 2D image.

Figure 3:
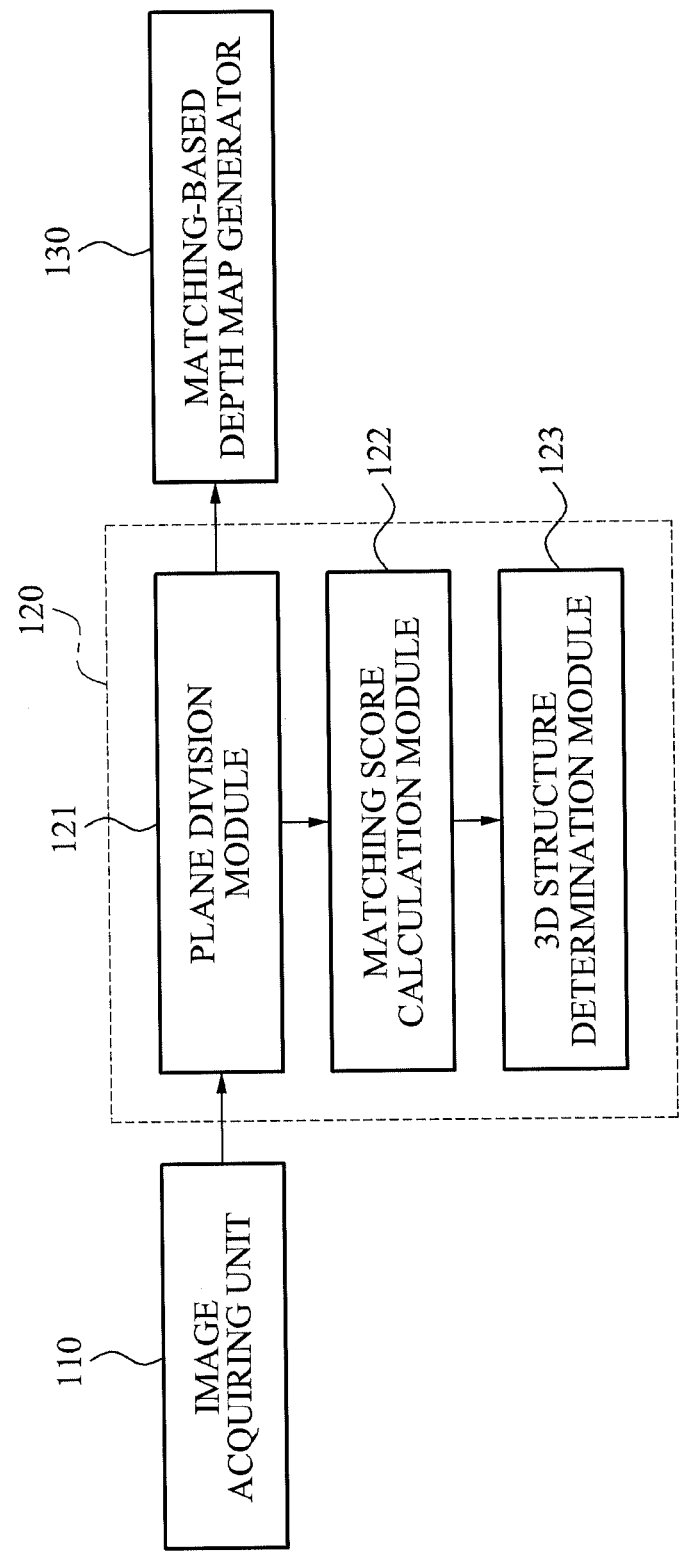
FIG. 3 illustrates a block diagram of a 3D structure matching unit according to example embodiments.

FIG. 3 illustrates the 3D structure matching unit 120.

Referring to FIG. 3, the 3D structure matching unit 120 includes a plane division module 121, a matching score calculation module 122, and a 3D structure determination module 123.

The plane division module 121 may divide the current 2D image into at least one plane based on one of the 3D typical structures that are stored in advance. For example, when the current 2D image is matched with a first 3D typical structure shown in the second row of FIG. 2, the current 2D image may be a single region, since the first 3D typical structure has only a single plane. Additionally, as an example, when the current 2D image is matched with a fourth 3D typical structure shown in the second row of FIG. 2, the current 2D image may be divided into four regions corresponding to four planes of the fourth 3D typical structure.

Subsequently, the matching score calculation module 122 may calculate a density of each region and a similarity between two regions, based on features of the regions of the current 2D image, and may calculate a matching score S using Equation 1 below. Here, the features of the regions may include, for example, colors, gradients, or edges. In Equation 1, "n" denotes a number of regions into which the current 2D image is divided, "ri" and "rj" denote regions into which the current 2D image is divided, "Density(ri)" denotes a density of each region, and "diff(ri, rj)" denotes a similarity between regions. Here, the density and the similarity may be calculated based on the features of the regions.

$$S = \sum_{i=1}^{n} \text{Density}(ri) + \sum_{i=1}^{n} \sum_{\substack{j=1 \\ j \neq i}}^{n} \text{diff}(ri, rj) \qquad \text{[Equation 1]}$$

"Density(ri)" may be calculated using the following Equation 2:

$$\text{Density}(ri) = \frac{1}{1 + std(ri)} \qquad \text{[Equation 2]}$$

In Equation 2, "std(ri)" denotes a standard distribution for features of the region "ri", and may be represented by the following Equation 3:

$$std(r) = \sqrt{\frac{\sum_{p \in r}(I(p) - \bar{I})^2}{\text{area}(r)}} \qquad \text{[Equation 3]}$$

In Equation 3, "p" denotes a pixel of the region "ri", "I(p)" denotes a feature value of the pixel p, "Ī" denotes an average value of feature values of pixels in the region "ri", and "area (r)" denotes a number of the pixels in the region "ri".

"diff(ri, rj)" may be calculated using the following Equation 4:

$$\text{diff}(ri, rj) = |\bar{I}_{ri} - \bar{I}_{rj}| \qquad \text{[Equation 4]}$$

In Equation 4, "Ī" denotes an average value of feature values of pixels in a region, and |.| denotes a norm. A 1-norm, a 2-norm and a ∞-norm may be respectively represented by $$|X|_1 = \sum_{i=1}^{n} x_i, \; |X|_2 = \sqrt{\sum_{i=1}^{n} x_i^2},$$

and $|X|_\infty = \max(x_i)$.

Additionally, "Density(ri)" denotes a density of features in a region, and the more compact the features in the region, the greater the value of "Density(ri)". "diff(ri, rj)" denotes a similarity between two regions, and the greater the difference between the two regions, the greater the value of "diff(ri, rj)". Accordingly, a relatively high matching score S means that features in each region which an image is divided into have similarity and individuality.

Generally, each 3D plane may have a consistent image feature, and two different 3D planes may have different features. When a current 2D image is divided into regions based on different 3D typical structures and when matching scores between the current 2D image and the 3D typical structures are respectively calculated, a higher matching score may indicate that the current 2D image matches better with a predetermined 3D typical structure. Thus, the 3D structure determination module 123 may determine a 3D typical structure having a highest matching score among the calculated matching scores to be the 3D structure of the current 2D image.

The matching-based depth map generator 130 may generate a matching-based depth map of the current 2D image based on the determined 3D structure. Each pixel in the matching-based depth map may be in a range of [0, 1], and may display a depth map of a corresponding pixel in the current 2D image.

In the embodiment, a relatively superior effect may be shown for an image occupying a main portion of a scene.

Figure 4:
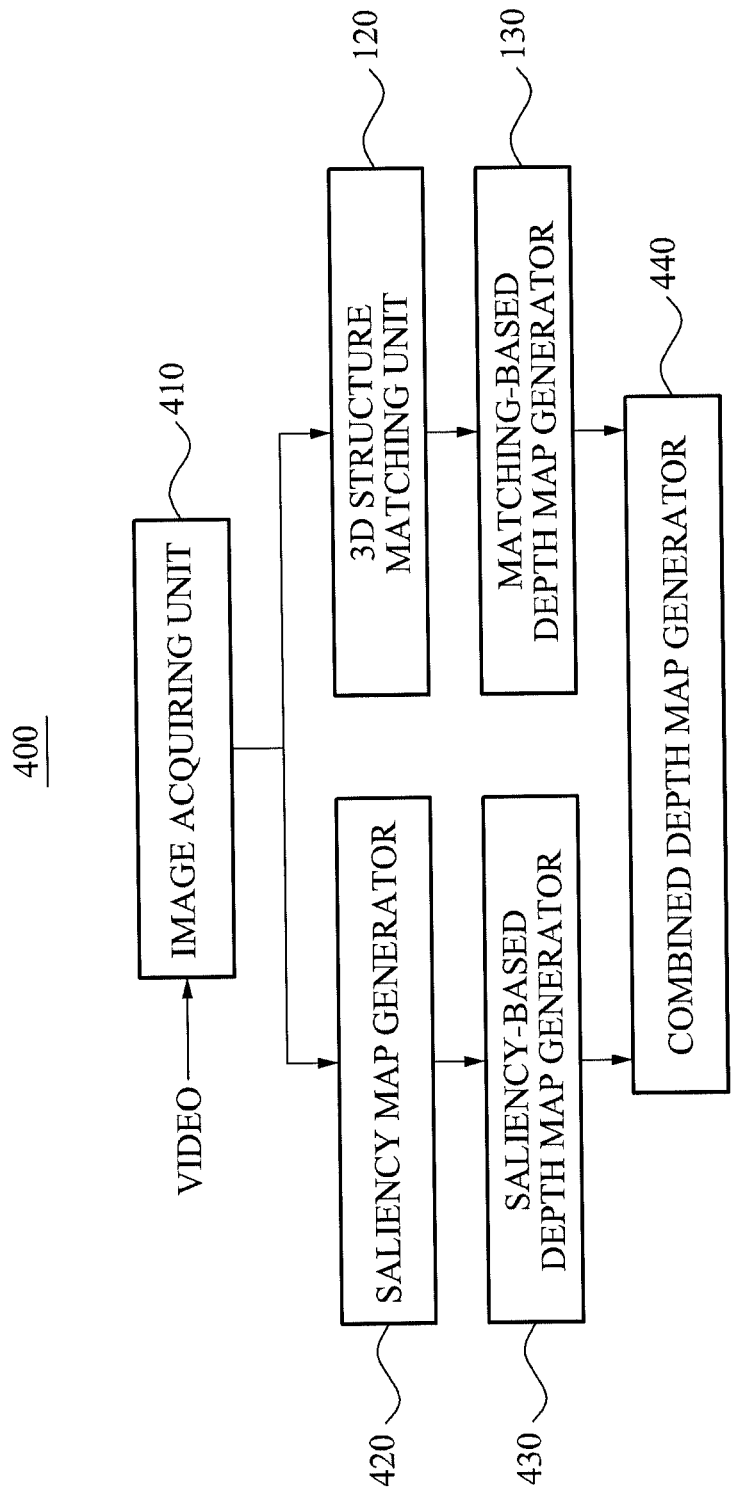
FIG. 4 illustrates a block diagram of an apparatus generating a depth map according to example embodiments.

FIG. 4 illustrates an apparatus 400 generating a depth map according to example embodiments.

Referring to FIG. 4, the apparatus 400 includes an image acquiring unit 410, a saliency map generator 420, a saliency-based depth map generator 430, a 3D structure matching unit 120, a matching-based depth map generator 130, and a combined depth map generator 440. The 3D structure matching unit 120 and the matching-based depth map generator 130 may be substantially identical to those shown in FIG. 1.

The apparatus 400 may receive an input video sequence including a plurality of images. The image acquiring unit 410 may acquire a plurality of 2D images that are temporally consecutive in the input video sequence.

In a Human Visual Perception (HVP) model, a viewer may have an interest in a salient portion in a video, and may feel closer to the salient portion. In other words, the salient portion may have a relatively low depth value. Accordingly, a feature, a motion or an object that show a saliency in a 2D image may be identified, and a depth value in a range of [0, 1] may be assigned to each pixel based on the identified feature, motion or object, to obtain a saliency-based depth map.

Figure 5:
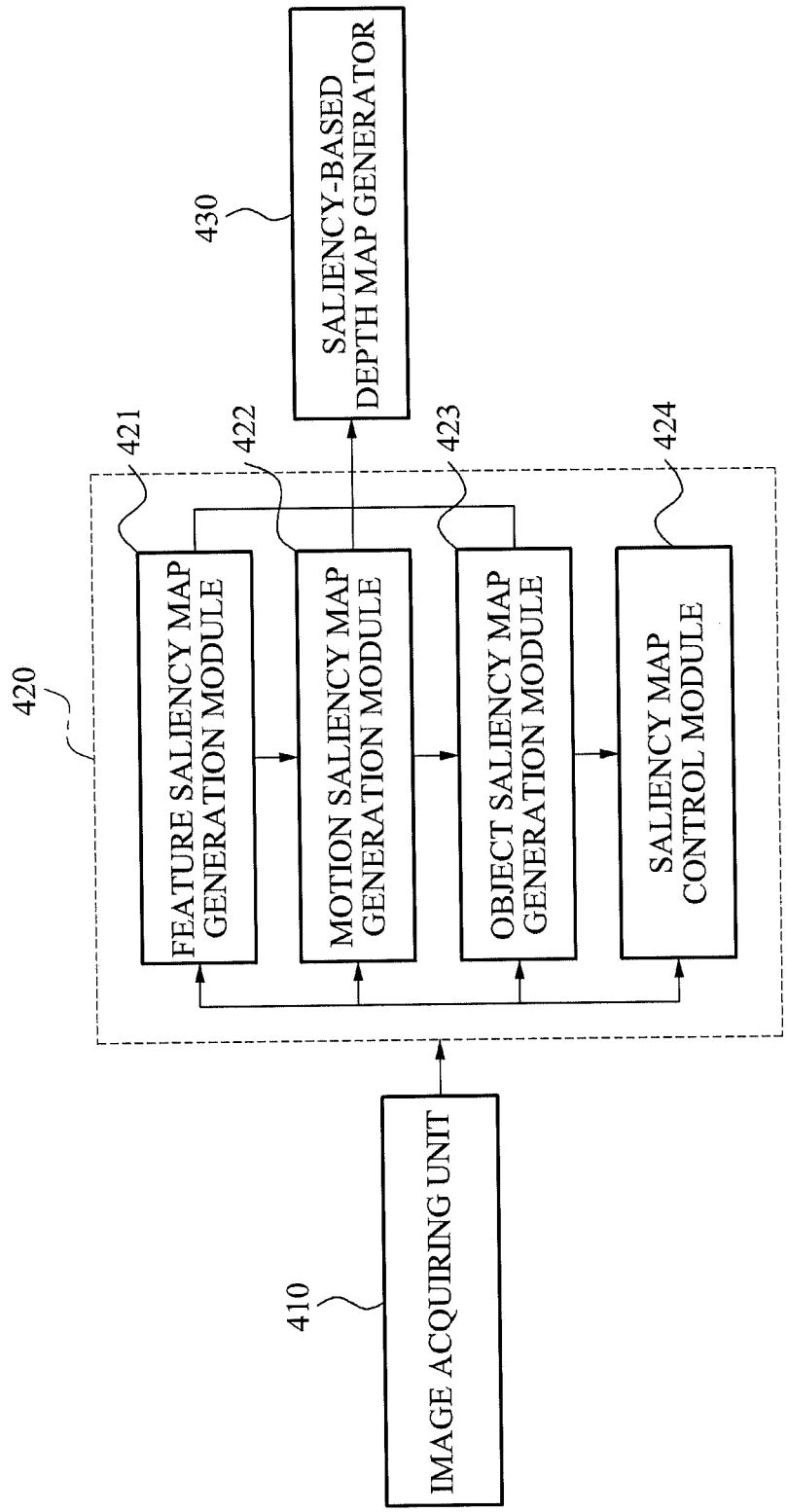
FIG. 5 illustrates a block diagram of a saliency map generator according to example embodiments.

As shown in FIG. 5, to identify features, motions or objects having the saliency in an image, the saliency map generator 420 includes a feature saliency map generation module 421, a motion saliency map generation module 422, an object saliency map generation module 423, and a saliency map control module 424.

The feature saliency map generation module 421 may identify features of a 2D image, such as colors, gradients or edges of the 2D image. For example, the feature saliency map generation module 421 may identify gradients of the 2D image using a Solbe operator or a Prewitt operator, and may identify edges of the 2D image using the Laplacian edge detection scheme.

The motion saliency map generation module 422 may identify motion between two temporally neighboring images, and may generate a motion saliency map.

The object saliency map generation module 423 may identify an object of a 2D image, such as a human, a face or a text of the 2D image, and may generate an object saliency map. For example, the object saliency map generation module 423 may identify a human and a face in a 2D image using an object identification model based on a boosting scheme.

The saliency map control module 424 may generate at least one saliency map using at least one of the feature saliency map generation module 421, the motion saliency map generation module 422, and the object saliency map generation module 423.

For example, when a 2D image of the video sequence contains a large number of humans, the saliency map control module 424 may use the object saliency map generation module 423. Additionally, when a 2D image of the video sequence has a relatively large number of motions, instead of having humans, faces or texts, the saliency map control module 424 may use the motion saliency map generation module 422, not the object saliency map generation module 423. In other words, the three generation modules 421, 422 and 423 may be used based on a 2D image sequence to be processed.

When only an object saliency map is generated, the saliency-based depth map generator 430 may assign a constant value in a range of (0, 1), for example 0.8, to a pixel corresponding to a pixel identified as an object of a 2D image in the saliency-based depth map, and may assign a value of "0" to other pixels in the saliency-based depth map.

When either a feature saliency map or a motion saliency map is generated, the saliency-based depth map generator 430 may assign a value in a range of [0, 1] to each pixel in the saliency-based depth map based on a saliency of each pixel in the feature saliency map or the motion saliency map. Here, a value of "0" may indicate that a corresponding pixel has a minimum saliency, and a value of "1" may indicate that a corresponding pixel has a maximum saliency.

Specifically, values in the range of [0, 1] may be assigned to each pixel in the saliency-based depth map, based on a difference between a feature value of a center pixel or of a center block and an average feature value of upper, lower, left and right neighboring pixels or of neighboring blocks. Here, the center pixel may be calculated in different sizes and at each image location.

For example, assuming that a feature saliency map is generated using color features, the color features may be vectors (R, G, B). First, a difference in an average value of vectors (R, G, B) of a single pixel and an average value of vectors (R, G, B) of upper, lower, left and right neighboring pixels may be calculated and recorded. Subsequently, a size may be enlarged to be a 4*4 block, a neighboring average of vectors (R, G, B) of 16 pixels in the 4*4 block may be calculated, and a difference between the neighboring average and a center average may be calculated. Additionally, a difference between a center average and an average in an 8*8 block may be calculated. This operation may be repeatedly performed by increasing the size. Differences obtained by the operation may be added and standardized to a value in a range of [0, 1], so that a saliency-based depth map may be obtained.

When two saliency maps other than an object saliency map are generated, the saliency-based depth map generator 430 may assign a standardized value or a relatively large value to a corresponding pixel in the saliency-based depth map. Here, the standardized value may be obtained by adding corresponding pixels in the two saliency maps, and the relatively large value may be selected from among the corresponding pixels.

When two saliency maps including an object saliency map are generated, the saliency-based depth map generator 430 may assign a constant value in a range of (0, 1), for example 0.8, to a pixel corresponding to each pixel identified as an object in the object saliency map in the saliency-based depth map, and may assign a corresponding pixel value of the other saliency map to other corresponding pixels in the saliency-based depth map.

When all saliency maps are generated, the saliency-based depth map generator 430 may assign a constant value in a range of (0, 1), for example 0.8, to a pixel corresponding to each pixel identified as an object in the object saliency map in the saliency-based depth map, and may assign a standardized value or a relatively large value to a corresponding pixel in the saliency-based depth map. Here, the standardized value may be obtained by adding corresponding pixels in two saliency maps other than the object saliency map, and the relatively large value may be selected from among the corresponding pixels.

The combined depth map generator 440 may standardize a value by adding corresponding pixel values in the saliency-based depth map and the matching-based depth map, or may select a relatively large value from among the corresponding pixel values, and may generate a combined depth map.

Figure 6:
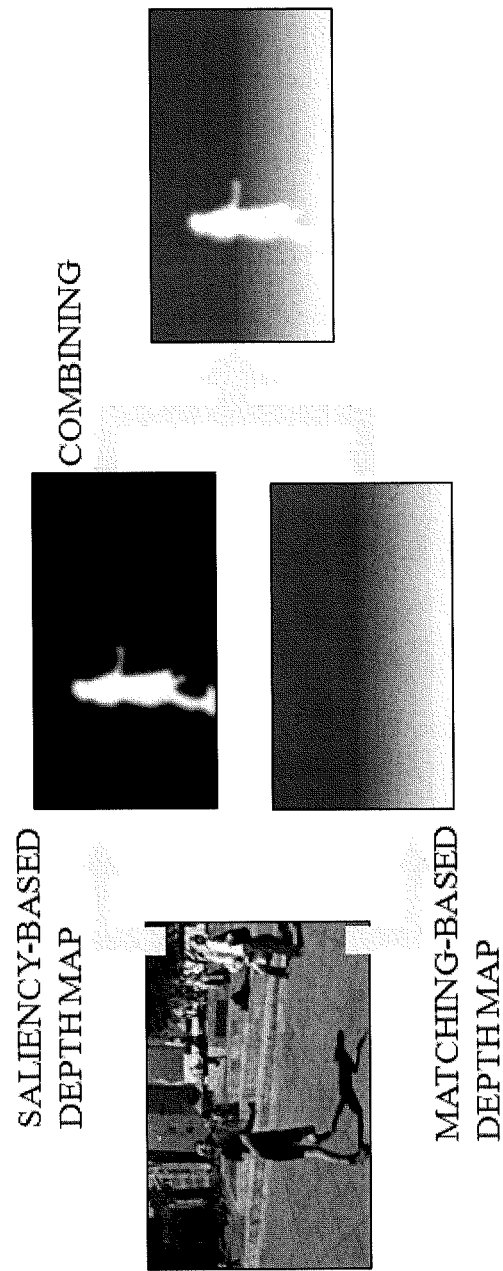
FIG. 6 illustrates a diagram of an example of a depth map generated using the example apparatus of FIG. 4.

FIG. 6 illustrates an example of a combined depth map generated by combining a saliency-based depth map and a matching-based depth map according to example embodiments.

Figure 7:
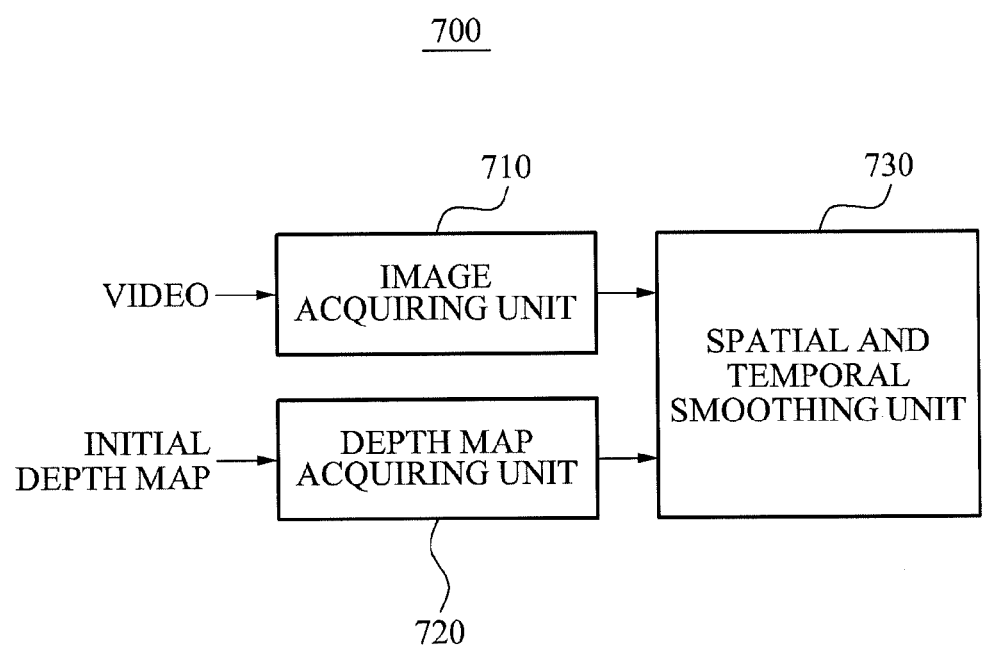
FIG. 7 illustrates a block diagram of an apparatus smoothing a depth map according to example embodiments.

FIG. 7 illustrates an apparatus 700 smoothing a depth map according to example embodiments.

Referring to FIG. 7, the apparatus 700 includes an image acquiring unit 710, a depth map acquiring unit 720, and a spatial and temporal smoothing unit 730.

The image acquiring unit 710 may acquire a plurality of 2D images that are temporally consecutive in an input video sequence including a plurality of images. The depth map acquiring unit 720 may acquire an initial depth map corresponding to each of the plurality of 2D images. Here, each pixel value of the initial depth map may be defined as a depth value of a corresponding pixel in a corresponding 2D image.

According to the Human Visual Perception (HVP) model, eyes of people may be sensitive to a sharp depth change in edges of an image. When a rapid depth change occurs between neighboring frames, a viewer may feel dizzy. Thus, the initial depth map may be spatially and temporally smoothed, to generate a depth map enabling a viewer to feel comfortable.

Figure 8:
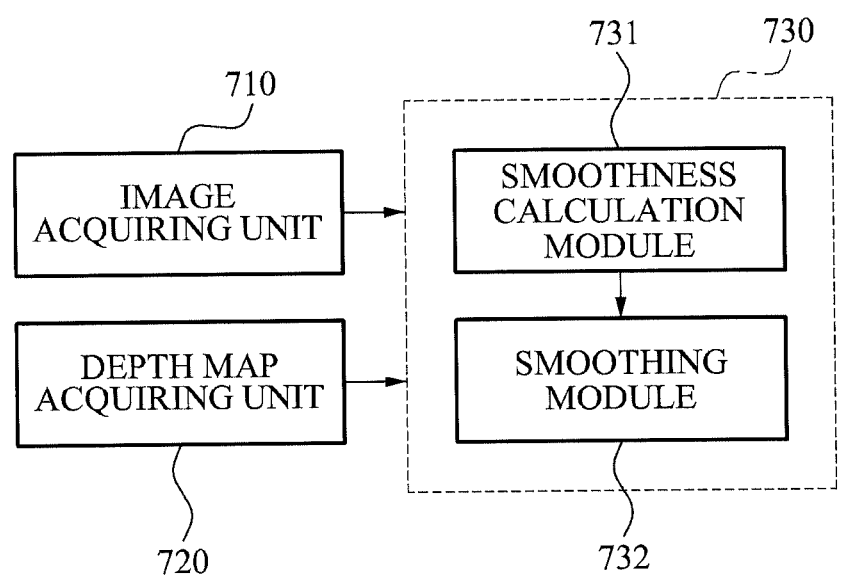
FIG. 8 illustrates a block diagram of a spatial and temporal smoothing unit according to example embodiments.

FIG. 8 illustrates the spatial and temporal smoothing unit 730.

Referring to FIG. 8, the spatial and temporal smoothing unit 730 may include a smoothness calculation module 731, and a smoothing module 732.

Figure 9:
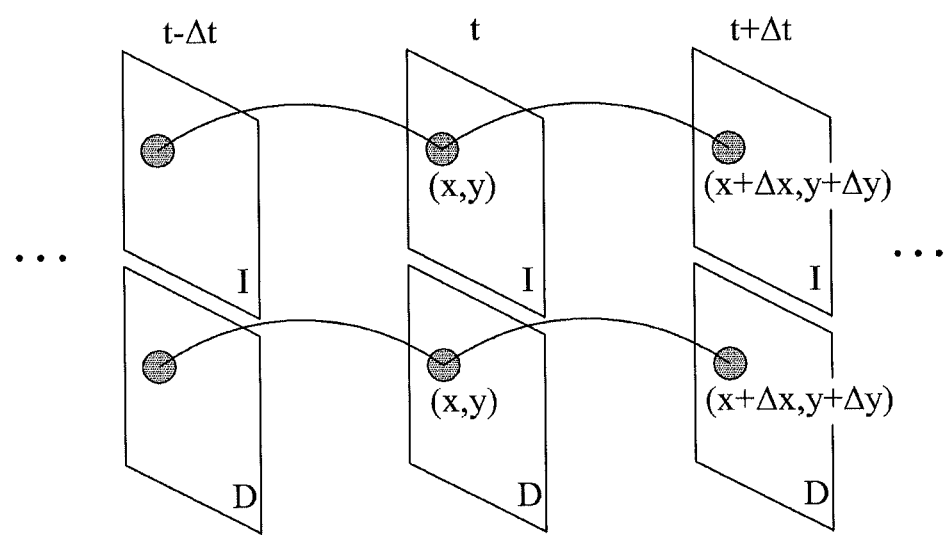
FIG. 9 illustrates operations of a smoothness calculation module and a smoothing module according to example embodiments.

FIG. 9 illustrates operations of the smoothness calculation module 731 and the smoothing module 732 according to example embodiments.

Referring to FIGS. 8 and 9, the smoothness calculation module 731 may compare feature values of a pixel P1 (x, y, t) in a frame t and feature values of a pixel P2 (x+Δx, y+Δy, t+Δt) that is spatially and temporally adjacent to the pixel P1. Here, the features values may include, for example, colors or patterns. When values of Δx, Δy and Δt are excessively high, too much smoothing may be performed. Conversely, when values of Δx, Δy and Δt are excessively low, no smoothing effect may be shown. Accordingly, the smoothness calculation module 731 may determine values of Δx, Δy and Δt to obtain a desired smoothing effect. For example, in Δx=5, Δy=5, Δt=5, a relatively appropriate smoothing effect may be obtained.

In accordance with the HVP model, for example, assuming that a color feature is used, when the pixels P1 and P2 have similar colors, a depth of the pixels P1 and P2 may be similar. Accordingly, a depth of the pixels P1 and P2 may be adjusted based on the colors of the pixels P1 and P2, so that an absolute value of a difference between a depth value D'(P1) of the smoothed pixel P1 and depth value D'(P2) of the smoothed pixel P2 may be less than an absolute value of a difference between a depth value D(P1) of the pixel P1 and depth value D(P2) of the pixel P2 prior to the smoothing.

The smoothness calculation module 731 may calculate the smoothness S using the following Equation 5:

$$S(P1,P2)=(D(P1)-D(P2))*N(P1,P2)*C(P1,P2)$$ [Equation 5]

In Equation 5, "D(.)" denotes a depth value of a pixel, "C(P1, P2)" denotes a difference, namely a similarity, between feature values of the pixels P1 and P2, and "N(P1, P2)" denotes a distance between the pixels P1 and P2 calculated based on (Δx, Δy, Δt). "C(P1, P2)" and "N(P1, P2)" may be respectively calculated using the following Equations 6 and 7:

$$C(P1, P2) = \begin{cases} 0.2, & |I(P1) - I(P2)| \le 32 \\ 0, & |I(P1) - I(P2)| \le 32 \end{cases}$$ [Equation 6]

In Equation 6, "I(.)" denotes a feature value of a pixel, and "|.|" denotes an absolute value of the feature value of the pixel.

$$N(P1, P2) = \begin{cases} 1, & |P1, P2| < 1 \\ 0, & |P1, P2| > 1 \end{cases}$$ [Equation 7]

In Equation 7, $|P1, P2| = \sqrt{\Delta x^2 + \Delta y^2 + \Delta t^2}$.

The smoothing module 732 may calculate a depth value D(P1)=D(P1)−S(P1) of the pixel P1 in the current 2D image that is smoothed based on the smoothness S(P1, P2).

The functions of the smoothness calculation module 731 and the smoothing module 732 may be applied to each pixel in the current 2D image, so that a depth map of the current smoothed 2D image may be obtained.

Figure 10:
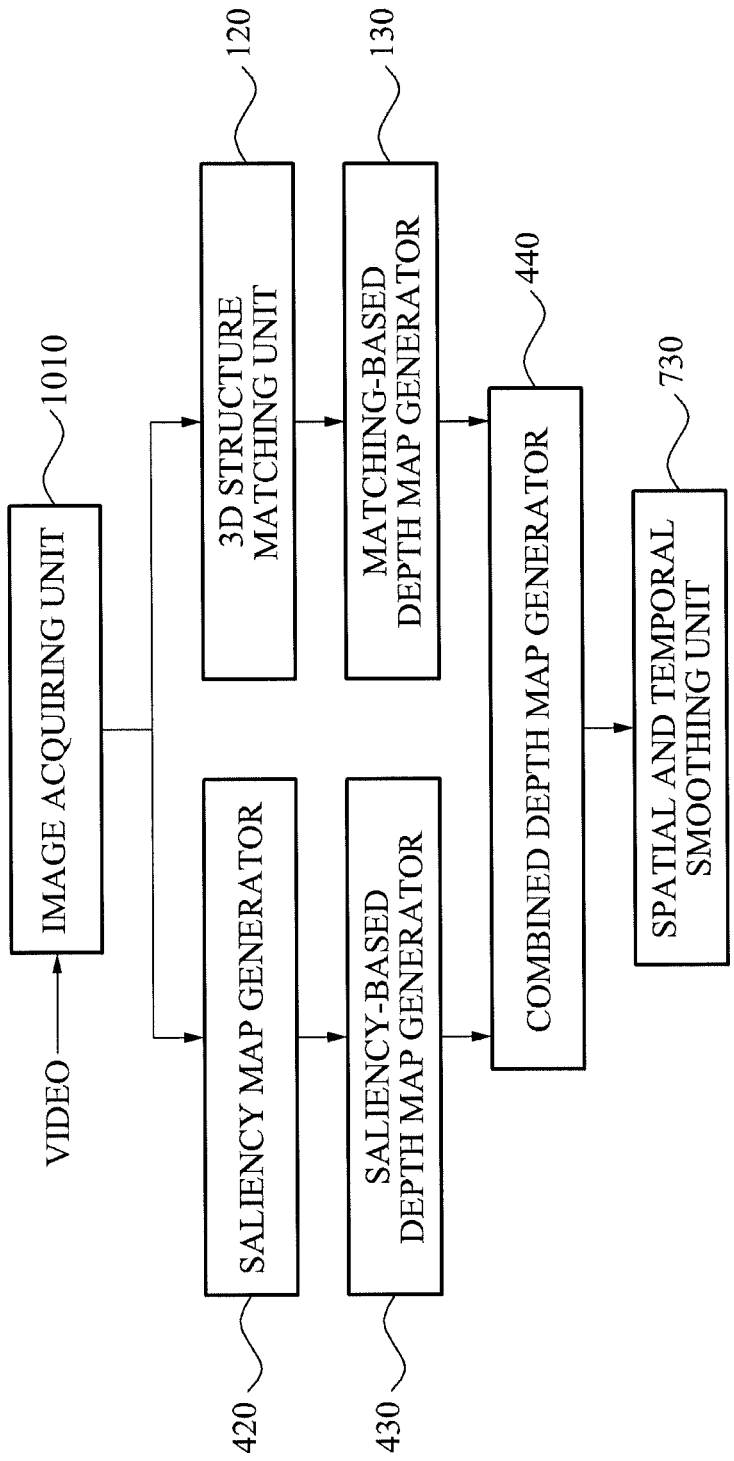
FIG. 10 illustrates a block diagram of an apparatus generating a depth map according to example embodiments.

FIG. 10 illustrates an apparatus 1000 for generating a depth map according to a further embodiment.

Referring to FIG. 10, the apparatus 1000 includes an image acquiring unit 1010, a saliency map generator 420, a saliency-based depth map generator 430, a 3D structure matching unit 120, a matching-based depth map generator 130, a combined depth map generator 440, and a spatial and temporal smoothing unit 730.

The saliency map generator 420, the saliency-based depth map generator 430 and the combined depth map generator 440 may be substantially identical to those shown in FIG. 4. The 3D structure matching unit 120 and the matching-based depth map generator 130 may be substantially identical to those shown in FIG. 1. The spatial and temporal smoothing unit 730 may be substantially identical to that shown in FIG. 7.

The image acquiring unit 1010 may acquire a plurality of 2D images that are temporally consecutive in an input video.

Figure 11:
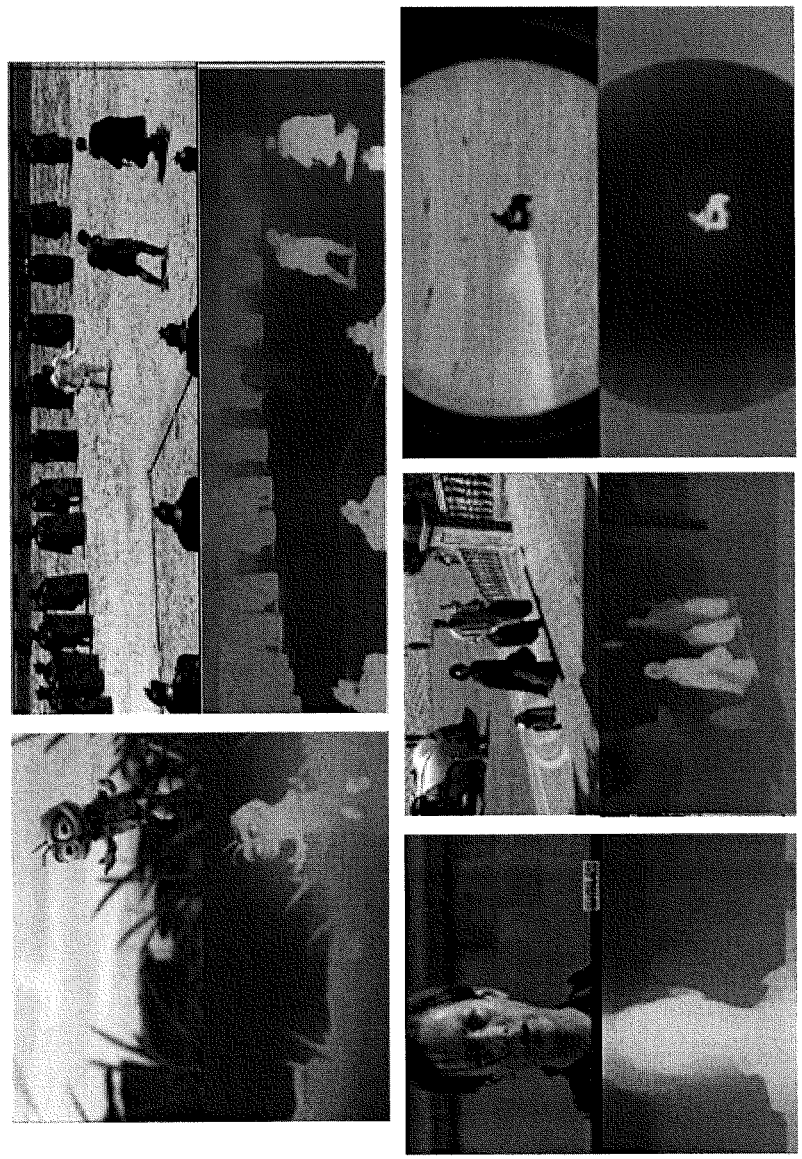
FIG. 11 illustrates a diagram of an example of a depth map generated using the example apparatus of FIG. 10.

FIG. 11 illustrates an example of a depth map generated by the apparatus 1000 of FIG. 10. Depth maps as shown in FIG. 11 may have relatively superior effects.

Figure 12:
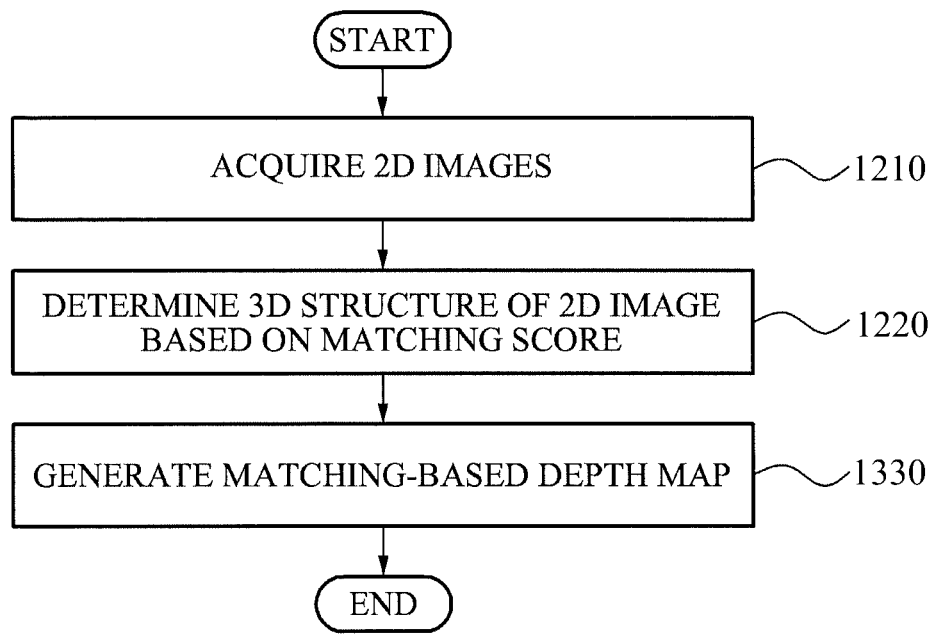
FIG. 12 illustrates a flowchart of a method of generating a depth map according to example embodiments.

FIG. 12 illustrates a flowchart of an operation of generating a matching-based depth map according to a further embodiment.

Referring to FIG. 12, in operation 1210, a plurality of 2D images may be acquired that are temporally consecutive in an input video.

In operation 1220, matching scores may be calculated between a current 2D image and a plurality of 3D typical structures that are stored in advance, and a 3D typical structure having a highest matching score may be determined to be a 3D structure of the current 2D image. A depth map of a 2D image may be generated using only a simple 3D typical structure based on characteristics of a human vision system, so that a better 3D experience may be provided as compared with a traditional 2D video, even though the 3D typical structures may be simpler than an actual structure of a real scene.

To obtain the 3D structure that most closely matches with the current 2D image, matching scores may be respectively calculated between the current 2D image and the plurality of 3D typical structures.

Figure 13:
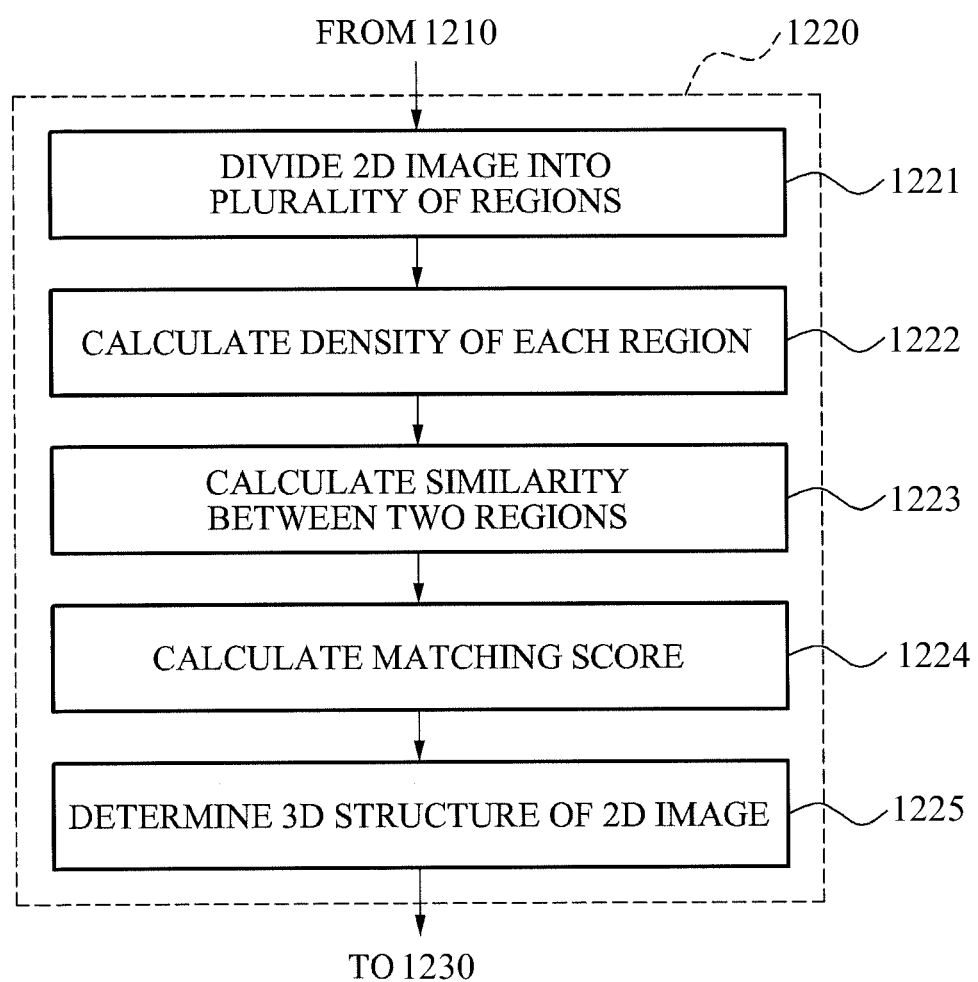
FIG. 13 illustrates a flowchart of an operation of determining a 3D structure of a current two-dimensional (2D) image according to example embodiments.

FIG. 13 illustrates a flowchart of an operation of determining a 3D structure of a current 2D image according to example embodiments.

Referring to FIG. 13, in operation 1221, a current 2D image may be divided into at least one plane based one of the plurality of 3D typical structures that are stored in advance. For example, when a 3D typical structure of FIG. 2 matched with the current 2D image has only a single plane, the current 2D image may be a single region. Additionally, when a 3D typical structure of FIG. 2 matched with the current 2D image has a plurality of planes, the current 2D image may be divided into a plurality of regions respectively corresponding to the plurality of planes of the 3D typical structure.

In operations 1222 through 1224, a density of each region and a similarity between two regions may be calculated based on features of the regions of the current 2D image, and the matching score S may be calculated using Equations 1 through 4. Here, the features of the regions may include, for example, colors, gradients, or edges. Additionally, a higher matching score calculated using Equation 1 may indicate that the current 2D image matches better with a predetermined 3D typical structure.

In operation 1225, a 3D typical structure having a highest matching score may be determined to be the 3D structure of the current 2D image.

Referring back to FIG. 12, in operation 1230, a matching-based depth map of the current 2D image may be generated based on the determined 3D structure. Each pixel in the matching-based depth map may be in a range of [0, 1], and may display a depth value of a corresponding pixel in the current 2D image. Here, a value of "0" may indicate that a corresponding pixel has a maximum depth value, and a value of "1" may indicate that a corresponding pixel has a minimum depth value. In the example embodiments, a relatively superior effect may be shown for an image occupying a main portion of a scene.

Figure 14:
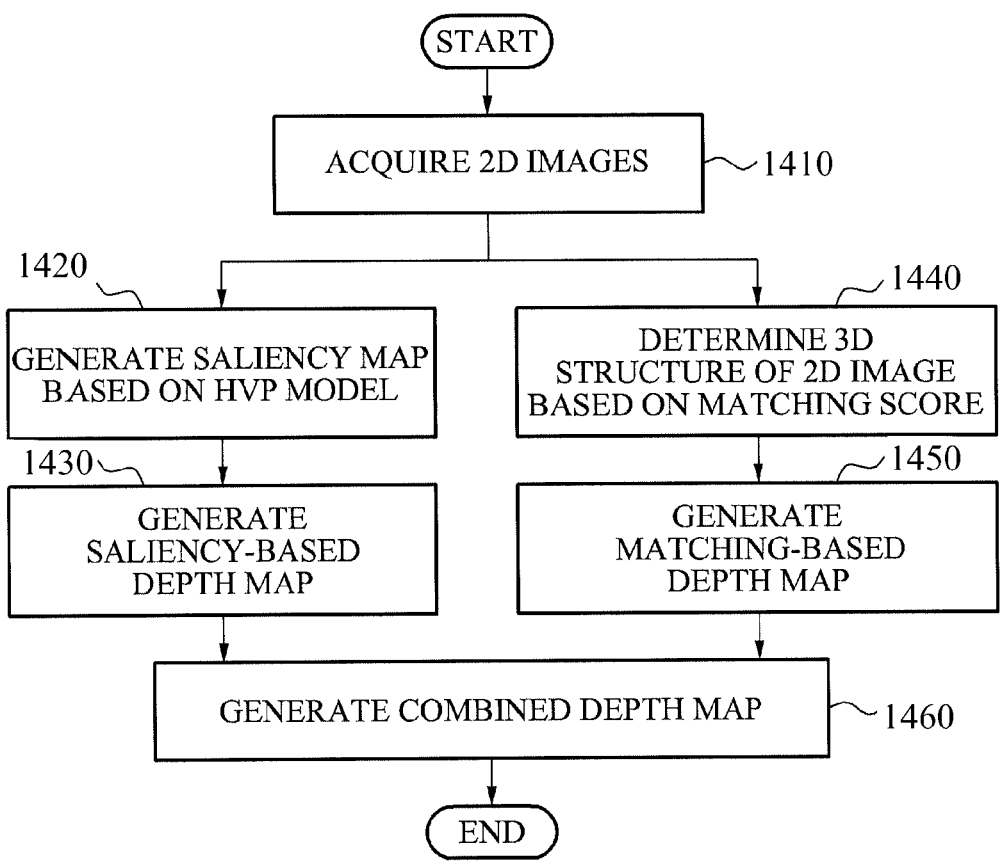
FIG. 14 illustrates a flowchart of a method of generating a depth map according to example embodiments.

FIG. 14 illustrates a flowchart of an operation of generating a saliency-based depth map according to example embodiments.

Referring to FIG. 14, in operation 1410, a plurality of 2D images may be acquired that are temporally consecutive in an input video.

In operation 1420, at least one of a feature saliency map, a motion saliency map, and an object saliency map may be generated. Specifically, the feature saliency map may be generated by identifying features of a 2D image, such as colors, gradients or edges of the 2D image. The motion saliency map may be generated by identifying a motion between two temporally neighboring 2D images, and the object saliency map may be generated by identifying an object of a 2D image, such as a human, a face or a text of the 2D image.

When only an object saliency map is generated in operation 1420, a constant value in a range of (0, 1), for example 0.8, may be assigned to a pixel corresponding to a pixel identified as an object of a 2D image in the saliency-based depth map, and a value of "0" may be assigned to other pixels in the saliency-based depth map in operation 1430.

When either a feature saliency map or a motion saliency map is generated in operation 1420, a value in a range of [0, 1] may be assigned to each pixel in the saliency-based depth map based on a saliency of each pixel in the feature saliency map or the motion saliency map in operation 1430. Here, a value of "0" may indicate that a corresponding pixel has a minimum saliency, and a value of "1" may indicate that a corresponding pixel has a maximum saliency. Specifically, values in the range of [0, 1] may be assigned to each pixel in the saliency-based depth map, based on a difference between a feature value of a center pixel or of a center block and an average feature value of upper, lower, left and right neighboring pixels or of neighboring blocks. Here, the center pixel may be calculated in different sizes and at each image location.

When two saliency maps other than an object saliency map are generated in operation 1420, a standardized value or a relatively large value may be assigned to a corresponding pixel in the saliency-based depth map in operation 1430. Here, the standardized value may be obtained by adding corresponding pixels in the two saliency maps, and the relatively large value may be selected from among the corresponding pixels.

When two saliency maps including an object saliency map are generated in operation 1420, a constant value in a range of (0, 1), for example 0.8, may be assigned to a pixel corresponding to each pixel identified as an object in the object saliency map in the saliency-based depth map, and a corresponding pixel value of the other saliency map may be assigned to other corresponding pixels in the saliency-based depth map in operation 1430.

When all saliency maps are generated in operation 1420, a constant value in a range of (0, 1), for example 0.8, may be assigned to a pixel corresponding to each pixel identified as an object in the object saliency map in the saliency-based depth map, and a standardized value or a relatively large value may be assigned to a corresponding pixel in the saliency-based depth map in operation 1430. Here, the standardized value may be obtained by adding corresponding pixels in two saliency maps other than the object saliency map, and the relatively large value may be selected from among the corresponding pixels.

Operations 1440 and 1450 of FIG. 14 may be respectively performed in the same manner as operations 1220 and 1230 of FIG. 12.

In operation 1460, a value may be standardized by adding corresponding pixel values in the saliency-based depth map generated in operation 1430 and the matching-based depth map generated in operation 1450, or a relatively large value may be selected from among the corresponding pixel values, so that a combined depth map may be generated.

Figure 15:
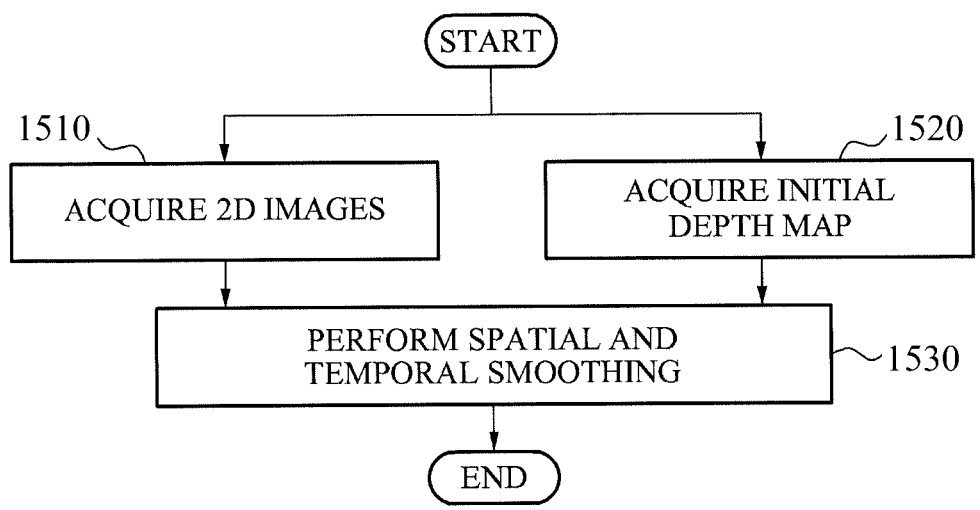
FIG. 15 illustrates a flowchart of an operation of smoothing a depth map according to example embodiments.

FIG. 15 illustrates a flowchart of an operation of smoothing a depth map according to example embodiments.

Referring to FIG. 15, in operation 1510, a plurality of temporally consecutive 2D images may be acquired from an input video sequence including a plurality of images.

In operation 1520, an initial depth map corresponding to each of the plurality of 2D images may be acquired. Here, each pixel value of the initial depth map may be defined as a depth value of a corresponding pixel in a corresponding 2D image.

Referring to FIGS. 9 and 15, in operation 1530, feature values of a pixel P1 (x, y, t) in a frame t and feature values of a pixel P2 (x+$\Delta$x, y+$\Delta$y, t+$\Delta$t) that is spatially and temporally adjacent to the pixel P1 may be compared. Here, the features values may include, for example, colors or patterns. When values of $\Delta$x, $\Delta$y and $\Delta$t are excessively high, excessive smoothing may be performed. Conversely, when values of $\Delta$x, $\Delta$y and $\Delta$t are excessively low, no smoothing effect may be shown. Accordingly, values of $\Delta$x, $\Delta$y and $\Delta$t may be determined to obtain a desired smoothing effect. For example, in $\Delta$x=5, $\Delta$y=5, $\Delta$t=5, a relatively appropriate smoothing effect may be obtained. In accordance with the HVP model, for example, assuming that a color feature is used, when the pixels P1 and P2 have similar colors, a depth of the pixels P1 and P2 may be similar. Accordingly, a depth of the pixels P1 and P2 may be adjusted based on the colors of the pixels P1 and P2, so that an absolute value of a difference between a depth value D(P1) of the smoothed pixel P1 and depth value D'(P2) of the smoothed pixel P2 may be less than an absolute value of a difference between a depth value D(P1) of the pixel P1 and depth value D(P2) of the pixel P2 prior to the smoothing.

The smoothness S may be calculated using Equations 5, 6, and 7.

Subsequently, a depth value D(P1)=D(P1)−S(P1) of the pixel P1 in the current 2D image may be calculated that is smoothed based on the smoothness S(P1, P2).

The smoothness S may be calculated for each pixel in the current 2D image, and the smoothing operation may be performed, so that a depth map of the current smoothed 2D image may be obtained.

FIG. 16 illustrates a flowchart of a method of generating a depth map according to example embodiments.

Referring to FIG. 16, in operation 1610, a plurality of temporally consecutive 2D images may be acquired from an input video sequence including a plurality of images. Operations 1620 through 1660 of FIG. 16 may be respectively performed in the same manner as operations 1420 through 1460 of FIG. 14. Additionally, operation 1670 of FIG. 16 may be performed in the same manner as operation 1530 of FIG. 15.

The example methods of generating a depth map according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. An apparatus generating a depth map, the apparatus comprising:

an image acquiring unit to acquire a plurality of two-dimensional (2D) images, the plurality of 2D images temporally consecutive in an input video;

a three-dimensional (3D) structure matching unit to calculate matching scores between a current 2D image among the plurality of 2D images and a plurality of 3D typical structures, and to determine a 3D typical structure having a highest matching score among the plurality of 3D typical structures to be a 3D structure of the current 2D image, the plurality of 3D typical structures stored in advance; and a matching-based depth map generator to store, in advance, depth maps of the 3D typical structures, and to set a depth map of the determined 3D typical structure to be a matching-based depth map corresponding to the current 2D image, each pixel in the matching-based depth map displaying a matching-based depth value of a corresponding pixel in the current 2D image.

2. The apparatus of claim 1, wherein the matching-based depth value is in a range of [0, 1] where a value of "0" indicates that a corresponding pixel has a maximum depth value and a value of "1" indicates that a corresponding pixel has a minimum depth value.

3. The apparatus of claim 1, wherein the 3D structure matching unit comprises:

a plane division module to divide the current 2D image into at least one region corresponding to a plane of the 3D typical structure matched with the current 2D image;

a matching score calculation module to calculate a density of the at least one region based on a feature distribution of the at least one region, to calculate an average value of features of the at least one region, to calculate a similarity between two regions based on a norm of a difference between the average values, and to calculate a matching score based on a sum of the density and the similarity; and a 3D structure determination module to determine, based on the calculated matching score, the 3D typical structure having the highest matching score to be the 3D structure of the current 2D image.

4. The apparatus of claim 3, wherein the matching score calculation module calculates a density of a region r based on $$\frac{1}{1+std(r)} \text{ where } std(r) = \sqrt{\frac{\sum_{p \in r}(I(p)-\bar{I})^2}{area(r)}},$$

p denotes a pixel of the region r, I(p) denotes a feature value of the pixel p, $\bar{I}$ denotes an average value of feature values of pixels in the region r, and area(r) denotes a number of the pixels in the region r.

5. The apparatus of claim 3, wherein the matching score calculation module calculates a similarity between a region ri and a region rj based on $|\bar{I}_{ri}-\bar{I}_{rj}|$ where $\bar{I}$ denotes an average value of the features of the region, and |.| denotes a norm.

6. The apparatus of claim 3, wherein the features comprise at least one of colors, gradients, and edges.

7. The apparatus of claim 5, wherein the norm comprises at least one of a 1-norm, a 2-norm and a ∞-norm.

8. A method of generating a depth map, the method comprising:

acquiring, by a processor, a plurality of 2D images, the plurality of 2D images temporally consecutive in an input video;

calculating, by the processor, matching scores between a current 2D image among the plurality of 2D images and a plurality of 3D typical structures, and determining a 3D typical structure having a highest matching score among the plurality of 3D typical structures to be a 3D structure of the current 2D image, the plurality of 3D typical structures stored in advance; and storing, in advance, depth maps of the 3D typical structures, and setting, by the processor, a depth map of the determined 3D typical structure to be a matching-based depth map corresponding to the current 2D image, each pixel in the matching-based depth map displaying a matching-based depth value of a corresponding pixel in the current 2D image.

9. The method of claim 8, wherein the matching-based depth value is in a range of [0, 1] where a value of "0" indicates that a corresponding pixel has a maximum depth value and a value of "1" indicates that a corresponding pixel has a minimum depth value.

10. The method of claim 8, wherein the calculating comprises:
dividing the current 2D image into at least one region corresponding to a plane of the 3D typical structure matched with the current 2D image;
calculating a density of the at least one region based on a feature distribution of the at least one region, calculating an average value of features of the at least one region, calculating a similarity between two regions based on a norm of a difference between the average values, and calculating a matching score based on a sum of the density and the similarity; and
determining, based on the calculated matching score, the 3D typical structure having the highest matching score to be the 3D structure of the current 2D image.

11. The method of claim 10, wherein a density of a region r is calculated based on $$\frac{1}{1+std(r)} \text{ where } std(r) = \sqrt{\frac{\sum_{p \in r}(I(p)-\bar{I})^2}{\text{area}(r)}},$$

p denotes a pixel of the region r, I(p) denotes a feature value of the pixel p, $\bar{I}$ denotes an average value of feature values of pixels in the region r, and area(r) denotes a number of the pixels in the region r.

12. The method of claim 10, wherein a similarity between a region ri and a region rj is calculated based on $|\bar{I}_{ri}-\bar{I}_{rj}|$ where $\bar{I}$ denotes an average value of the features of the region, and |.| denotes a norm.

13. The method of claim 12, wherein the norm comprises at least one of a 1-norm, a 2-norm and a ∞-norm.

14. The method of claim 10, wherein the features comprise at least one of colors, gradients, and edges.

15. At least one non-transitory computer readable recording medium comprising computer readable instructions that cause a computer to implement the method of claim 8.

* * * * *